(12) United States Patent
Kwon et al.

(10) Patent No.: US 11,734,577 B2
(45) Date of Patent: Aug. 22, 2023

(54) ELECTRONIC APPARATUS AND METHOD OF PERFORMING OPERATIONS THEREOF

(71) Applicant: SAMSUNG ELECTRONICS CO., LTD., Suwon-si (KR)

(72) Inventors: Sejung Kwon, Suwon-si (KR); Dongsoo Lee, Suwon-si (KR)

(73) Assignee: SAMSUNG ELECTRONICS CO., LTD, Suwon-si (KR)

( * ) Notice: Subject to any disclaimer, the term of this patent is extended or adjusted under 35 U.S.C. 154(b) by 339 days.

(21) Appl. No.: 16/876,688

(22) Filed: May 18, 2020

(65) Prior Publication Data
US 2020/0387801 A1    Dec. 10, 2020

(30) Foreign Application Priority Data
Jun. 5, 2019    (KR) ..................... 10-2019-0066396

(51) Int. Cl.
*G06N 3/10*    (2006.01)
*G06F 17/16*    (2006.01)

(52) U.S. Cl.
CPC ............... *G06N 3/10* (2013.01); *G06F 17/16* (2013.01)

(58) Field of Classification Search
CPC ... G06F 7/57; G06F 7/544; G06F 9/48; G06F 13/28; G06F 17/15; G06F 17/16; G06K 9/38; G06K 9/62; G06N 3/04; G06N 3/08; G06N 3/10; G06N 3/0463; G06N 5/02; G06N 5/04; G06N 10/00; G06N 20/10; H03M 7/30; H03M 7/40
USPC ........................ 706/44, 15, 25, 46
See application file for complete search history.

(56) References Cited

U.S. PATENT DOCUMENTS

| | | | |
|---|---|---|---|
| 5,809,490 | A | 9/1998 | Guiver et al. |
| 8,086,052 | B2 | 12/2011 | Toth et al. |
| 9,400,955 | B2 | 7/2016 | Garimella |
| 9,916,531 | B1 | 3/2018 | Zivkovic et al. |
| 10,417,525 | B2 | 9/2019 | Ji et al. |

(Continued)

FOREIGN PATENT DOCUMENTS

| | | |
|---|---|---|
| CN | 106203624 A | 12/2016 |
| CN | 107103113 B | 1/2019 |
| JP | 2019-32729 A | 2/2019 |
| JP | 2020-9048 A | 1/2020 |
| KR | 10-0248072 B1 | 3/2000 |
| KR | 10-2006-0027795 A | 3/2006 |

(Continued)

OTHER PUBLICATIONS

Communication dated Aug. 14, 2020, issued by the International Searching Authority in counterpart International Application No. PCT/KR2020/006411 (PCT/ISA/210 and PCT/ISA/237).

(Continued)

*Primary Examiner* — Shawkat M Ali
(74) *Attorney, Agent, or Firm* — Sughrue Mion, PLLC

(57) ABSTRACT

A method for an electronic apparatus to perform an operation of an artificial intelligence model includes acquiring resource information for hardware of the electronic apparatus while a plurality of data used for an operation of a neural network model are stored in a memory, the plurality of data respectively having degrees of importance different from each other; obtaining data to be used for the operation of the neural network model among the plurality of data according to the degrees of importance of each of the plurality of data based on the acquired resource information; and performing the operation of the neural network model by using the obtained data.

17 Claims, 8 Drawing Sheets

(56) References Cited

U.S. PATENT DOCUMENTS

| | | | |
|---|---|---|---|
| 2016/0086078 A1* | 3/2016 | Ji | G06N 3/084 382/157 |
| 2016/0328645 A1 | 11/2016 | Lin et al. | |
| 2016/0328647 A1 | 11/2016 | Lin et al. | |
| 2017/0286830 A1 | 10/2017 | El-Yaniv et al. | |
| 2017/0337471 A1 | 11/2017 | Kadav et al. | |
| 2018/0046903 A1 | 2/2018 | Yao et al. | |
| 2018/0107925 A1 | 4/2018 | Choi et al. | |
| 2018/0300603 A1 | 10/2018 | Ambardekar et al. | |
| 2018/0300614 A1 | 10/2018 | Ambardekar et al. | |
| 2018/0341857 A1 | 11/2018 | Lee et al. | |
| 2019/0042935 A1 | 2/2019 | Deisher | |
| 2019/0042948 A1 | 2/2019 | Lee et al. | |
| 2019/0057308 A1 | 2/2019 | Cho et al. | |
| 2019/0087744 A1 | 3/2019 | Schiemenz | |
| 2019/0347554 A1 | 11/2019 | Choi et al. | |
| 2020/0012926 A1 | 1/2020 | Murata | |
| 2020/0082269 A1 | 3/2020 | Gao et al. | |
| 2020/0097818 A1 | 3/2020 | Li et al. | |
| 2020/0143249 A1 | 5/2020 | Georgiadis | |
| 2020/0184318 A1 | 6/2020 | Minezawa et al. | |
| 2020/0302292 A1* | 9/2020 | Tseng | G06N 3/08 |
| 2021/0232894 A1 | 7/2021 | Yamada et al. | |

FOREIGN PATENT DOCUMENTS

| | | |
|---|---|---|
| KR | 10-0662516 B1 | 12/2006 |
| KR | 10-0790900 B1 | 1/2008 |
| KR | 10-2016-0034814 A | 3/2016 |
| KR | 10-2018-0013674 A | 2/2018 |
| KR | 10-2018-0043154 A | 4/2018 |
| KR | 10-2018-0120967 A | 11/2018 |
| KR | 10-2019-0054449 A | 5/2019 |
| KR | 10-2019-0093932 A | 8/2019 |
| KR | 10-2019-0130455 A | 11/2019 |
| KR | 10-2020-0049422 A | 5/2020 |
| KR | 10-2020-0052200 A | 5/2020 |
| WO | 2017/049496 A1 | 3/2017 |
| WO | 2019008752 A1 | 1/2019 |
| WO | 2019088657 A1 | 5/2019 |
| WO | 2020/075433 A1 | 4/2020 |

OTHER PUBLICATIONS

International Search Report (PCT/ISA/210) dated Apr. 18, 2019 by the International Searching Authority in counterpart International Patent application No. PCT/KR2019/000142.

Written Opinion (PCT/ISA/237) dated Apr. 18, 2019 by the International Searching Authority in counterpart International Patent application No. PCT/KR2019/000142.

International Search Report (PCT/ISA/210) dated May 28, 2021 by the International Searching Authority in counterpart International Patent application No. PCT/KR2021/001766.

Written Opinion (PCT/ISA/237) dated May 28, 2021 by the International Searching Authority in counterpart International Patent application No. PCT/KR2021/001766.

Communication dated Jun. 24, 2021 by the European Patent Office in counterpart European Patent Application No. 19800295.8.

Shuchang Zhou et al., "IQNN: Training Quantized Neural Networks with Iterative Optimizations", Springer International Publishing AG, 2017, pp. 688-695. (8 pages total).

Zhengping Ji et al/, "Reducing Weight Precision of Convolutional Neural Networks towards Large-scale On-chip Image Recognition", Proc. of SPIE, 2015, vol. 9496, p. 94960A-1-94960A-9. (9 pages total).

Ratko Pilipovic, Patricio Bulic et al., "Compression of convolutional neural networks", 17th International Symposium Infoteh-Jahorina, Mar. 21-23, 2018. (6 pages total).

Hao Li et al., "Towards a Deeper Understanding of Training Quantized Neural Networks", Presented at the ICML 2017 Workshop on Principled Approaches to Deep Learning, Sydney, Australia, 2017. (9 pages total).

Eunhyeok Park et al., "Weighted-Entropy-based Quantization for Deep Neural Networks", 2017 IEEE Conference on Computer Vision and Pattern Recognition, pp. 7197-7205. (9 pages total).

Dong et al., "Learning Accurate Low-Bit Deep Neural Networks with Stochastic Quantization", arXiv:1708.01001v1 [cs.CV], Aug. 3, 2017. (12 pages total).

CHEn Xu et al., "Alternating Multi-Bit Quantization for Recurrent Neural Networks", arXiv:1802.00150V1 [cs.LG], Feb. 1, 2018. (13 pages total).

Chenzhou Zhu et al., "Trained Ternary Quantization", Published as a conference paper at ICLR 2017, arXiv:1612.01064v3 [cs.LG], Feb. 23, 2017. (10 pages total).

Matthieu Courbariaux et al., "BinaryConnect: Training Deep Neural Networks with binary weights during propagations", NIPS 2015. (9 pages total).

Communication dated May 27, 2022, issued by the European Patent Office in counterpart European Application No. 20819392.0.

Yang et al., "Deploy Large-Scale Deep Neural Networks in Resource Constrained IoT Devices with Local Quantization Region," arxiv.org, Cornell University Library, May 24, 2018, XP081234517, Total 8 pages.

* cited by examiner

FIG. 3

310 $\begin{cases} \text{ExecutionModel} = \{\text{Model}_1, \text{Model}_2, \cdots, \text{Model}_i\} \\ \text{Constraints} = \{(\text{Power}, P_h), (\text{Latency}, L_h), \cdots\} \\ \text{mode} = \text{current\_mode} \quad \text{\#Assume that 'mode' is 0~15} \\ \text{max\_cost} = \text{LUT.}\textbf{GetMaxCost}\,(\text{Constraints}) \\ \text{costs} = \text{LUT.}\textbf{GetCost}(\text{ExecutionModel}) \end{cases}$ 320 $\begin{cases} \textbf{while}\ \text{True:} \\ \quad \textbf{if}\ \text{cost[mode]} > \text{max\_cost:} \\ \quad\quad \text{mode} \mathrel{+}= 1 \\ \quad \textbf{else if}\ \text{cost[mode} - 1] < \text{max\_cost:} \\ \quad\quad \text{mode} \mathrel{-}= 1 \\ \quad \textbf{else:} \\ \quad\quad \text{break} \end{cases}$ 330 — return LUT.GetOrder(ExecutionModel, mode)

ELECTRONIC APPARATUS AND METHOD OF PERFORMING OPERATIONS THEREOF

CROSS-REFERENCE TO RELATED APPLICATION(S)

This application is based on and claims priority under 35 U.S.C. § 119 to Korean Patent Application No. 10-2019-0066396, filed on Jun. 5, 2019, in the Korean Intellectual Property Office, the disclosure of which is incorporated by reference herein in its entirety.

BACKGROUND

1. Field

The disclosure relates to an electronic apparatus and a method of performing operations of the electronic apparatus, and more particularly, to a method of performing operations of an artificial neural network model.

2. Description of Related Art

Recently, a study of implementing an artificial intelligence model (e.g., a deep-learning model) by using hardware is being continued. In the case of implementing an artificial intelligence model by using hardware, the speed of operations of the artificial intelligence model can be greatly improved, and use of various deep-learning models that were previously difficult to use due to the memory sizes or limitation on the response time became possible.

Algorithms for continuously improving the performance of an artificial intelligence model from the viewpoint of implementation of hardware are being suggested, as for example, a data quantization technology which reduces the amount of operation data for reducing operation delays and power consumption.

Data quantization is, for example, a method of reducing the amount of information expressing parameters of a matrix, and may decompose real number data into binary data and scaling factors and express the data as an approximate value. As quantized data cannot reach the precision of the original data, the precision of inference by an artificial intelligence model using quantized data may be lower than the precision of the original inference by an artificial intelligence model. However, considering the limited circumstance of hardware, quantization to a certain extent can save the use amount of a memory or consumption of computing resources, and thus it is being actively studied in the field of on-device artificial intelligence.

SUMMARY

Embodiments of the disclosure provide an electronic apparatus which reduces the data capacity of an artificial intelligence model, and at the same time, minimizes deterioration of the performance of the artificial intelligence model, and a method of performing an operation of the artificial intelligence model.

In accordance with an aspect of the disclosure, a method for an electronic apparatus to perform an operation of an artificial intelligence model includes an operation of acquiring resource information for hardware of the electronic apparatus while a plurality of data respectively having different degrees of importance from one another, which are used for an operation of a neural network model, are stored in a memory, an operation of obtaining some data to be used for an operation of the neural network model among the plurality of data according to the degrees of importance of each of the plurality of data based on the acquired resource information, and an operation of performing an operation of the neural network model by using the obtained some data.

In accordance with an aspect of the disclosure, an electronic apparatus includes a memory storing a plurality of data respectively having different degrees of importance from one another, and a processor configured to obtain some data to be used for an operation of the neural network model among the plurality of data according to the degrees of importance of each of the plurality of data being stored in the memory based on resource information for the hardware of the electronic apparatus, and perform an operation of the neural network model by using the obtained some data.

According to embodiments, it is possible to flexibly adjust the amount of data used for a neural network model according to the requirements of hardware. For example, an improved effect can be expected in at least one of the aspect of latency, the aspect of power consumption, or the aspect of a user.

In the aspect of latency, it may be possible to exclude binary data having a low degree of importance and selectively use only binary data having a high degree of importance in an operation of a neural network model in consideration of the time for requesting execution of the neural network model, and thereby satisfy the requirement with minimum reduction of accuracy.

In the aspect of power consumption, in an example when the remaining amount of the battery of an electronic apparatus is determined to be low, the amount of data such that a neural network model operates with the minimum performance in consideration of the condition of hardware (e.g., low charge of the battery) may be controlled, and the operational time of the electronic apparatus thus may be extended.

In the aspect of a user (or a developer), in the related art, it has been difficult for the user to judge the optimal amount of data to be used for a neural network model in consideration of the operation amounts and other restrictions of artificial intelligence applications mounted on an electronic apparatus. However, according to an embodiment, it is possible to automatically adjust the amount of data appropriately in consideration of latency and power consumption based on the condition of hardware, and thus it becomes possible to maintain the accuracy of inference of an artificial intelligence model above a certain degree, and at the same time, effectively execute a neural network model.

According to an embodiment, the problem that a neural network model is not executed or latency becomes great in a situation where the hardware resources are limited can be overcome. That is, it is possible to flexibly adjust the amount of data for an operation of the neural network model in consideration of the currently available resources of hardware, and, accordingly, even if the amount of data increases, the latency is maintained below a certain level, and a neural network model can operate without stoppage and above a certain threshold of accuracy.

BRIEF DESCRIPTION OF THE DRAWINGS

FIG. 3 illustrates an example of a scheduling syntax according to an embodiment;

DETAILED DESCRIPTION

Figure 1:
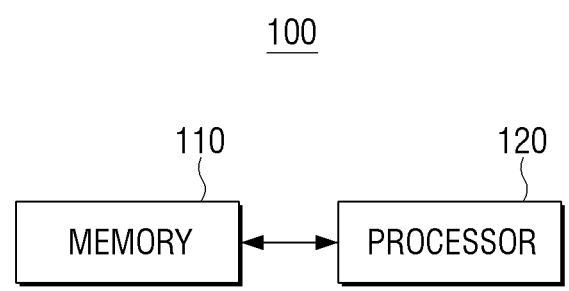
FIG. 1 is a block diagram illustrating a configuration of an electronic apparatus according to an embodiment.

The embodiments of the present disclosure may be diversely modified. Accordingly, specific embodiments are illustrated in the drawings and are described in detail in the detailed description. However, it is to be understood that the present disclosure is not limited to a specific embodiment, but includes all modifications, equivalents, and substitutions without departing from the scope and spirit of the present disclosure. Also, well-known functions or constructions are not described in detail since they would obscure the disclosure with unnecessary detail.

Hereinafter, various embodiments of the disclosure will be described in detail with reference to the accompanying drawings.

FIG. 1 is a block diagram illustrating a configuration of an electronic apparatus 100 according to an embodiment. As illustrated in FIG. 1, the electronic apparatus 100 includes a memory 110 and a processor 120.

The electronic apparatus 100 may be a server, a desktop PC, a laptop computer, a smartphone, a tablet PC, etc. Alternatively, the electronic apparatus 100 is an apparatus using an artificial intelligence model, and it may be a cleaning robot, a wearable apparatus, a home appliance, a medical apparatus, an Internet of Things (IoT) apparatus, or an autonomous vehicle.

The memory 110 in FIG. 1 may store a plurality of data respectively having different degrees of importance from one another. The plurality of data respectively having different degrees of importance from one another may include, for example, parameter values of a quantized matrix used for an operation of a neural network model. In this case, if there are a plurality of matrices used for an operation of a neural network model, the electronic apparatus 100 may include parameter values respectively having different degrees of importance from one another for each of the plurality of quantized matrices.

As another example, the plurality of data respectively having different degrees of importance from one another may be a plurality of neural network layers respectively having different degrees of importance from one another used for an operation of a neural network model.

As still another example, the plurality of data having different degrees of importance from one another may be parameter values of a matrix before being quantized. In this case, the parameter values of the matrix may consist of binary data respectively having different degrees of importance from one another, and for example, the degrees of importance may increase according to the bit orders.

In the case the plurality of data are parameter values of a quantized matrix, the quantization process of the matrix performed for acquiring the parameter values may be performed by the electronic apparatus 100. Alternatively, the quantization process may be performed at an external apparatus and the parameter values of the quantized matrix may be stored in the memory 110 in advance.

In the case the parameter values of a matrix are quantized, the parameter values of the matrix of a full-precision value may be converted into binary data (or, quantized bits) in k numbers (e.g., +1 and −1) bi and a scaling coefficient factor ai values. In the case of performing an operation of a neural network model by using the parameter values of a quantized matrix, the use amount of the memory and the use amount of the computer during inference between neural network layers may decrease, but the accuracy of inference may deteriorate.

Accordingly, various quantization algorithms for enhancing the accuracy of inference may be used.

For example, in the case of quantizing parameter values of a w matrix to have bit numbers in k numbers, various algorithms satisfying the condition of [Formula 1] may be used.

$$\min_{\{a_i, b_i\}_{i=1}^k} \left\| w - \sum_{i=1}^{k} \alpha_i b_i \right\|^2, \text{ with } b_i \in \{-1, +1\}^n. \quad \text{[Formula 1]}$$

For satisfying the condition of [Formula 1], as an example, an alternating algorithm (e.g., an alternating multi-bit algorithm), etc. may be used. An alternating algorithm is an algorithm which repetitively updates binary data and a coefficient factor and finds a value by which the [Formula 1] becomes minimal. For example, in an alternating algorithm, binary data may be calculated again based on an updated coefficient factor and updated, and a coefficient factor may be calculated again based on updated binary data and updated. This process may be repeated until the error value becomes smaller than or equal to a specific value.

An alternating algorithm may guarantee high accuracy, but may require a large amount of computing resources and operation time for updating binary data and a coefficient factor. In particular, in an alternating algorithm, in the case parameter values are quantized into bits in k numbers, all of the k bits have similar degrees of importance, and thus accurate inference can be possible only when an operation of a neural network model is performed by using all of the bits in k numbers.

In other words, in the case of performing an operation of a neural network model while omitting some bits, the accuracy of the neural network operation may deteriorate. As an example, in an environment where the resources of the electronic apparatus 100 are limited (e.g., an on-device artificial intelligence chip environment), in the case an operation of a neural network model is performed by using only some bits in consideration of the resources of the electronic apparatus 100, the accuracy of the neural network operation may deteriorate.

Accordingly, an algorithm that can flexibly respond toward limited hardware resources may be required. As an example, for quantization of parameter values of a matrix, a greedy algorithm quantizing the parameter values such that each bit of binary data has a different degree of importance from one another may be used.

In the case of quantizing the parameter values of a matrix into bits ink numbers by using a greedy algorithm, the first binary data and the coefficient factor of the bits in k numbers in [Formula 1] may be calculated by using [Formula 2].

$$b^* = \text{sign}(w), \alpha^* = \frac{w^\top b^*}{n}. \qquad \text{[Formula 2]}$$

Next, the ith bit (1<i≤k) may repeat the same calculation as in [Formula 3] toward r which is the difference between the original parameter value and the first quantized value. That is, by calculating the ith bit by using the residues that remained after calculating the (i−1) bit, the parameter values of a quantized matrix having bits in k numbers may be acquired.

$$\min_{\alpha_i, b_i} \|r_{i-1} - \alpha_i b_i\|^2, \text{ where} \qquad \text{[Formula 3]}$$

$$r_{i-1} = w - \sum_{j=1}^{i-1} \alpha_j b_j, \, 1 < i \le k.$$

Accordingly, the parameter values of a quantized matrix having bits in k numbers may be acquired.

In addition to the above, for further minimizing an error between the original parameter value and a quantized parameter value of a matrix, a refined greedy algorithm based on a greedy algorithm may be used. A refined greedy algorithm may update a coefficient factor as in [Formula 4] by using a vector b determined through a greedy algorithm.

$$[\alpha_1, \ldots, \alpha_j] = ((B_j^T B_j)^{-1} B_j^T w)^T, \text{ with } B_j = [b_1, \ldots, b_j], \qquad \text{[Formula 4]}$$

In the case of using a greedy algorithm (or, a refined greedy algorithm), as the order of a bit becomes higher, the value of a coefficient factor becomes smaller, and accordingly, the degree of importance of the bit decreases. Thus, even if an operation is omitted for a bit having a high bit order, there may be little influence on inference of a neural network. In a neural network model, a method of applying noises intentionally to about 10% of parameter values may be used for improving the accuracy of inference. In this case, even if an operation is performed while omitting some bits of binary data quantized by a greedy algorithm, it is difficult to be deemed that the accuracy of inference of a neural network deteriorates in general. Rather, a circumstance where the accuracy of inference of a neural network is rather improved may occur.

In the case of quantizing parameter values of a matrix to include bits having different degrees of importance, an adaptive operation of a neural network model in consideration of the requirements (e.g., power consumption, operation time) of given computing resources becomes possible. That is, it becomes possible to adjust the performance of a neural network model according to the degree of importance for each of various neural network models.

Also, without having to make an effort to consider the optimal number of quantized bits for each neural network model, it becomes possible to flexibly adjust the number of quantized bits to be applied to a neural network model according to the condition or limited condition after mounting a matrix quantized to a certain degree. In addition, the cost of development required for finding an optimal condition for execution for each neural network model can be saved.

The processor 120 in FIG. 1 may control the overall operations of the electronic apparatus 100. The processor 120 may be a generic-purpose processor (e.g., a central processing unit (CPU) or an application processor), a graphic-dedicated processor (e.g., a GPU), or a system on chip (SoC) where processing is performed (e.g., an on-device artificial intelligence (AI) chip), a large scale integration (LSI), or a field programmable gate array (FPGA). The processor 120 may include one or more of a CPU, a micro controller unit (MCU), a micro processing unit (MPU), a controller, an application processor (AP) or a communication processor (CP), and an ARM processor, or may be defined by the terms.

While the processor 120 stores a plurality of data having different degrees of importance from one another in the memory 110, the processor 120 may obtain some data to be used for an operation of a neural network model among the plurality of data according to the degrees of importance of each of the plurality of data stored in the memory 110, based on resource information for the hardware of the electronic apparatus 100. As an example, in the case the plurality of data include binary data as parameter values of a quantized matrix, the processor 120 may obtain the number of binary data to be used for an operation of a neural network model among the plurality of data. For example, as the bit orders of binary data increase, the degrees of importance may decrease.

When some data to be used for an operation of a neural network model are obtained, the processor 120 may perform an operation of a neural network model by using the obtained some data. As an example, the processor 120 may perform matrix operations for an input value and each bit of the binary data, and sum up the operation results for each bit and acquire an output value. In the case where a plurality of neural network processing units exist, the processor 120 may perform a matrix parallel operation using a plurality of neural network processing units based on the order of each bit of binary data.

Figure 2:
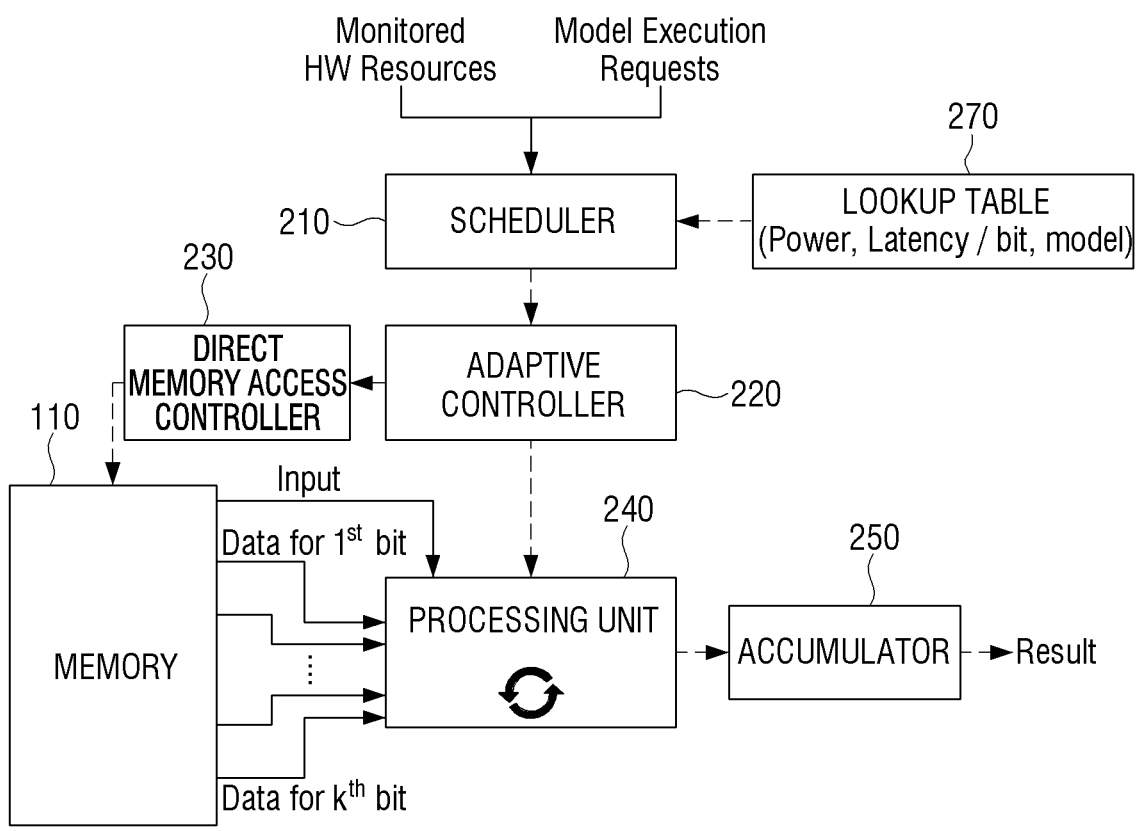
FIG. 2 is a block diagram illustrating components for a neural network operation including a processing unit according to an embodiment.

FIG. 2 is a block diagram illustrating components for a neural network operation including a processing unit according to an embodiment.

The electronic apparatus 100 into which the block diagram of FIG. 2 is included may include, for example, an on-device artificial intelligence chip performing inference of a neural network by using hardware.

The parameter values of a matrix used for inference of a neural network by using hardware may be, for example, in a state of being quantized by using a greedy algorithm, so that important binary data can be selectively used. The degree of importance of the binary data which are the quantized parameter values may decrease as the bit orders increase.

In FIG. 2, the electronic apparatus 100 may include a scheduler 210, an adaptive controller 220, a direct memory access controller (DMAC) 230, a processing unit 240, and an accumulator 250. At least one of the scheduler 210, the adaptive controller 220, the direct memory access controller 230, the processing unit 240, or the accumulator 250 may be implemented as software and/or hardware. For example, the scheduler 210, the adaptive controller 220, the direct memory access controller 230, the processing unit 240, and the accumulator 250 may be the function blocks of the processor 120. As another example, the scheduler 210, the adaptive controller 220, and the direct memory access controller 230 are the function blocks of the first processor which is the sub-processor of the processor 120, and the processing unit 240 and the accumulator 250 may be the function blocks of the second processor which is another sub-processor of the processor 120. The first processor is a processor which is in charge of control of the second processor, and the second processor is a processor optimized for operations, and for example, it may be an artificial intelligence processor or a graphics processor.

The scheduler 210 may receive resource information related to hardware, and instructions requesting execution of a neural network model.

In response to an instruction requesting execution of a neural network model, the scheduler 210 may determine the number of quantized bits to be used for operations of each neural network model with reference to a lookup table 270. A lookup table may be stored in a read only memory (ROM) or a random access memory (RAM) area of the processor 120, or stored in the memory 110 outside the processor 120.

A lookup table may store, for example, scheduling modes in k numbers. In this case, the number of quantized bits to be used for operations of neural network models may be defined in advance for each scheduling mode. For example, the number of quantized bits may be defined differently according to the degrees of importance of neural network models.

The scheduler 210 may first determine hardware conditions for performing an inference job according to a request instruction with a degree of accuracy above a certain level. For example, as hardware conditions, the scheduler 210 may determine the total number of operations of the processing unit 240 for performing an inference job, power consumption which is power for an operation process of a neural network model, and latency which is the time until acquiring an output value which is the operation time of a neural network model. The scheduler 210 may compare the hardware resource information (e.g., power consumption per time, latency) which is currently available and hardware conditions for performing the inference job, and determine the number of quantized bits for each neural network model.

The process where the scheduler 210 determines the number of quantized bits for each neural network model will be described in more detail through the scheduling syntax in FIG. 3.

The adaptive controller 220 may control the operation orders of neural network models, or may perform control such that operations are performed while each neural network model has a different amount of bits from one another.

For example, the adaptive controller 220 may control the processing unit 240 and the direct memory access controller 230 in consideration of the number of quantized bits for each neural network model acquired from the scheduler 210. Alternatively, the adaptive controller 220 may acquire resource information related to hardware resources from the scheduler 210, and determine the number of quantized bits to be used for operations of neural network models in consideration of this.

The adaptive controller 220 may control the processing unit 240 and the direct memory access controller 230, and thereby perform control such that quantized bits after a specific number are not used for operations of neural network models.

The direct memory access controller 230 may perform control such that an input value and quantized parameter values stored in the memory 110 are provided to the processing unit 240 by control of the adaptive controller 220. In the memory 110, quantized parameter values may be aligned according to the orders of bits and stored. For example, quantized parameter values of the first bit may be aligned as one data format and stored, and quantized parameter values of the second bit may be aligned as one data format and stored, and in succession, quantized parameter values of the Nth bit may be aligned as one data format and stored. In this case, the direct memory access controller 230 may perform control such that the quantized parameter values of the first bit to the quantized parameter values of the Nth bit stored in the memory 110 are sequentially provided to the processing unit 240 by control of the adaptive controller 220. Alternatively, the direct memory access controller 230 may perform control such that the quantized parameter values of the first bit to the Kth bit (N<K) are sequentially provided to the processing unit 240.

The processing unit 240 may perform matrix operations by using the input value and the quantized parameter values received from the memory 110 and acquire operation results for each bit order, and the accumulator 250 may sum up the operation results for each bit order and acquire an output result (or, an output value).

As an example, in the case parameter values are quantized into the N bit, the processing unit 240 may be called N times for multiplication operations of the matrix, and operations may be performed sequentially for the first bit to the Nth bit.

FIG. 3 illustrates an example of a scheduling syntax performed at the scheduler 210 according to an embodiment.

In FIG. 3, the definition part 310 of the scheduling syntax may define in advance an 'Execution Model' having neural network models (e.g., a voice recognition model, an image recognition model, etc.) which are the subjects of execution as values, 'Constraints' having information related to hardware resources (e.g., power consumption, latency) as a value, a 'mode' having scheduling modes as values, a 'max cost' which is the maximum operation cost in consideration of hardware resources acquired from a lookup table, and a 'cost' which is an operation cost acquired from a lookup table with respect to neural network models.

The scheduling modes may be, for example, included in a lookup table and define the optimal number of quantized bits to be used for operations of each neural network model. As an example, in FIG. 3, 16 scheduling modes are defined, and it may be defined that, in the case of the 0 mode, all neural network models are executed with full-precision, and in the case of the 15th mode, all neural network models are calculated by using only 1 bit, and in the 2nd mode, for example, a voice recognition model uses 3 bits as quantized bit data, and an image recognition model uses 2 bits as quantized bit data.

In FIG. 3, the while conditional sentence 320 may compare the operation costs of neural network models according to the current scheduling mode and the maximum operation cost in consideration of hardware resources.

As a result of comparison, when optimal scheduling modes for each neural network model are determined in consideration of hardware resources, the scheduler 210 may acquire the optimal number of quantized bits to be used for each neural network model under the current hardware condition as the return value 330 of the scheduling syntax from the lookup table and provide it to the adaptive controller 220.

Figure 4:
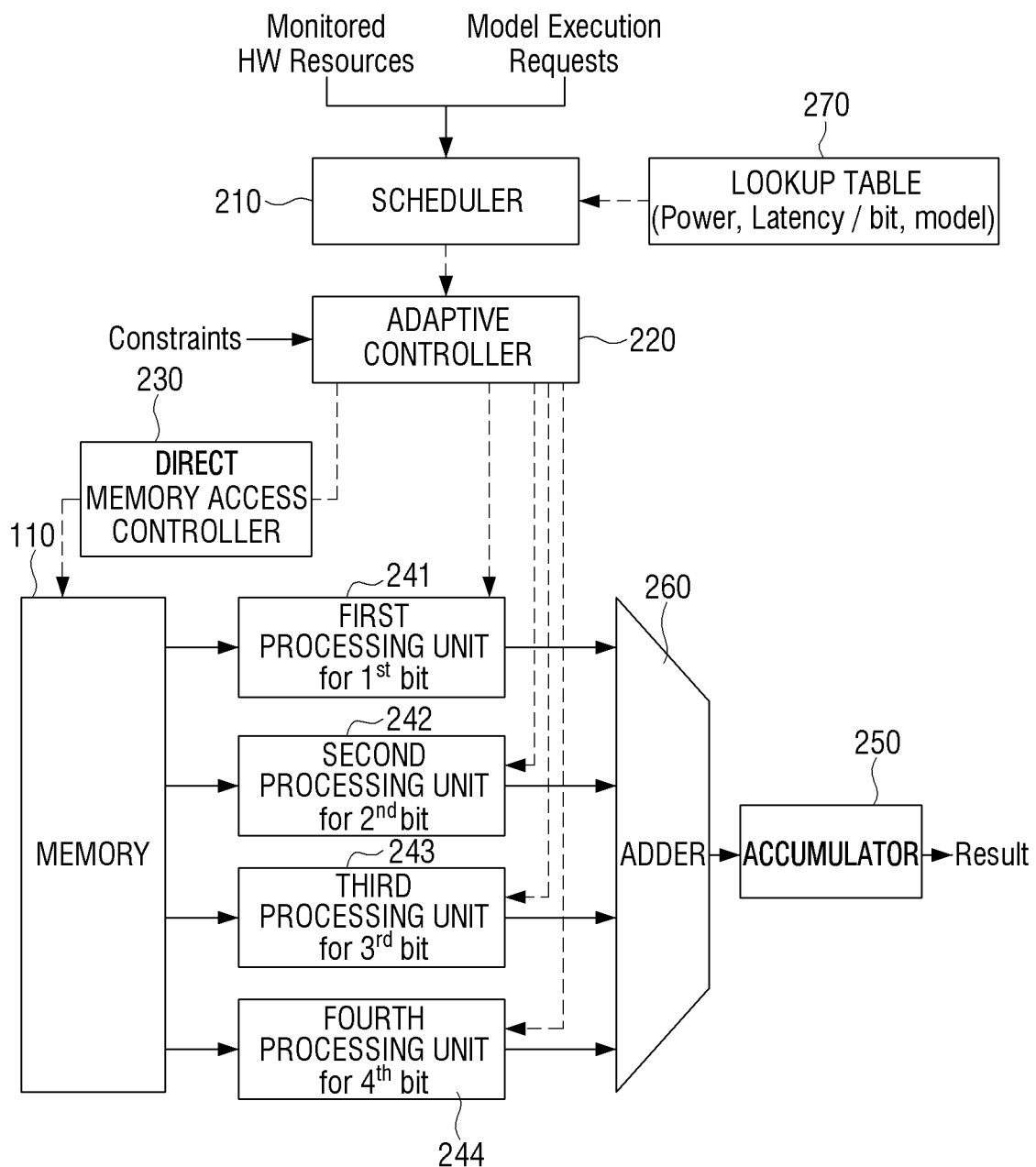
FIG. 4 is a block diagram illustrating components for a neural network operation including a plurality of processing units according to an embodiment.

FIG. 4 is a block diagram illustrating components for a neural network operation including a plurality of processing units according to an embodiment.

In FIG. 4, in the case there is a spare space in the operation area of the processor 120, a plurality of processing units 241 to 244, e.g., a first processing unit 241, a second processing unit 242, a third processing unit 243, and a fourth processing unit 244, may be provided in the processor 120. In this case, it may be possible to perform parallel operations by using the plurality of processing units 241 to 244.

The scheduler 210, the adaptive controller 220, the direct memory access controller 230, and the accumulator 250 are described above with reference to FIG. 2, and thus overlapping descriptions will be omitted.

In FIG. 4, the plurality of processing units 241 to 244 may perform matrix parallel operations based on bit orders. For example, the first processing unit 241 may perform an operation with respect to an input value and the first quantized bit, the second processing unit 242 may perform an operation with respect to an input value and the second quantized bit, the third processing unit 243 may perform an operation with respect to an input value and the third quantized bit, and the fourth processing unit 244 may perform an operation with respect to an input value and the fourth quantized bit. The adder 260 may collect operation results of the plurality of processing units 241 to 244 and transmit them to the accumulator 250.

In the case of using the plurality of processing units 241 to 244, the adaptive controller 220 may control each of the plurality of processing units 241 to 244. The direct memory access controller 230 may control the memory 110 such that the quantized parameter values are input while being distinguished according to the bit orders in consideration of the bit orders that each of the plurality of processing units 241 to 244 processes. In particular, in a circumstance where the plurality of processing units 241 to 244 are used, the scheduler 210 may determine a scheduling mode in further consideration of the power consumption of the processor according to operation of the plurality of processing units 241 to 244 and the latency of a neural network operation.

In the case of performing an operation of a neural network model by using the plurality of processing units 241 to 244, in the memory 110, quantized parameter values may be realigned for each bit order and stored.

Figure 5:
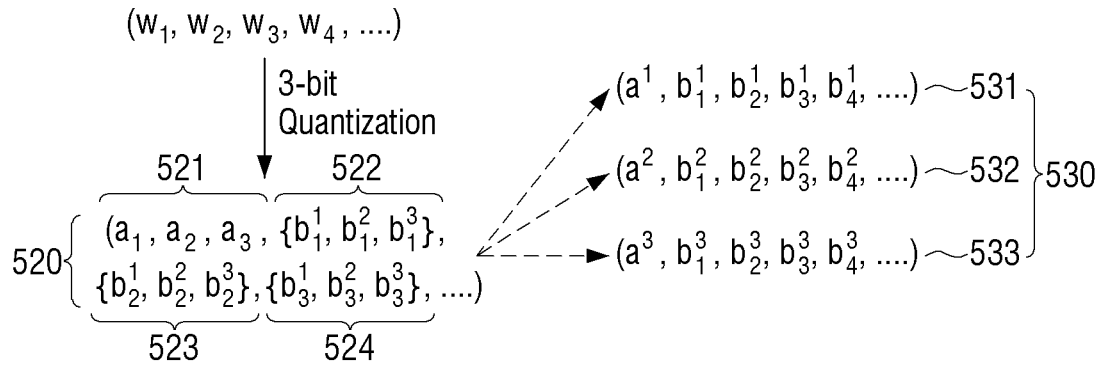
FIG. 5 is a diagram illustrating a process by which quantized parameter values are stored in a memory for each bit order according to an embodiment.

FIG. 5 is a diagram illustrating a process where quantized parameter values are stored in the memory 110 for each bit order according to an embodiment.

For example, in FIG. 5, 32 bit parameter values in a real number type may exist as parameter values of a neural network model. In this case, if the parameter values are quantized into 3 bits, the parameter values in a real number type may be expressed as coefficient factors 521 and binary data of 3 bits 522, 523, 524 (numeral 520 in FIG. 5).

For effective operation of the plurality of processing units 241 to 244, the quantized parameter values may be realigned. As shown by reference numeral 530 in FIG. 5, the quantized parameter values may be realigned according to the bit orders. For example, with respect to each of the first processing unit 241, the second processing unit 242, and the third processing unit 243 in FIG. 4, the quantized parameter values may be realigned as shown by reference numerals 531, 532, and 533 in FIG. 5 and stored in the memory 110.

Figure 6:
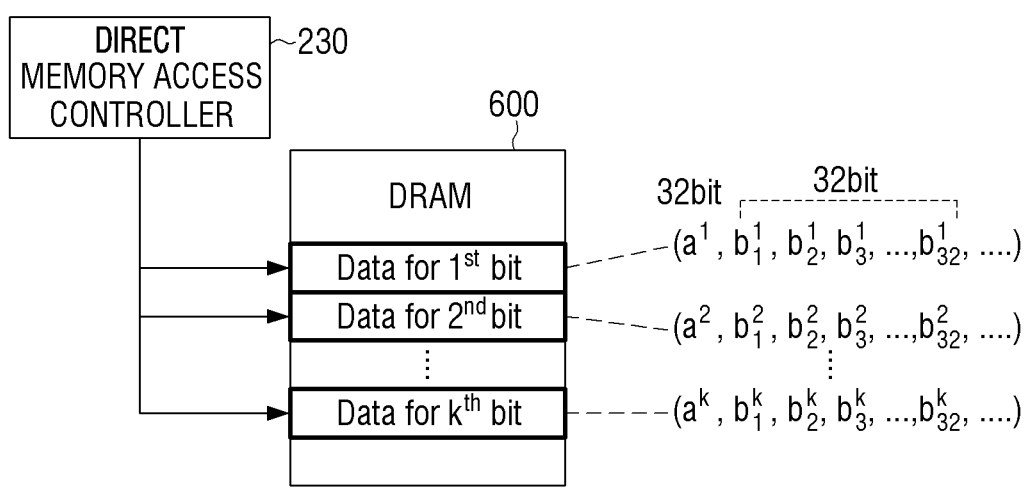
FIG. 6 is a diagram illustrating a process by which quantized parameter values are stored in a memory for each bit order according to an embodiment.

FIG. 6 illustrates a state where quantized parameter values are stored in the memory 110. In an embodiment, the memory 110 may include a DRAM 600. The quantized parameter values may be aligned according to the bit orders and stored in the DRAM 600. In this case, 32 binary data may be included in 32 bit-word values.

As described above, quantized parameter values are stored in the memory 110 in word units to correspond to the operations of each of the plurality of processing units 241 to 244, and accordingly, quantized parameter values for a neural network operation may be effectively read from the memory 110 and transmitted to each of the plurality of processing units 241 to 244.

Figure 7:
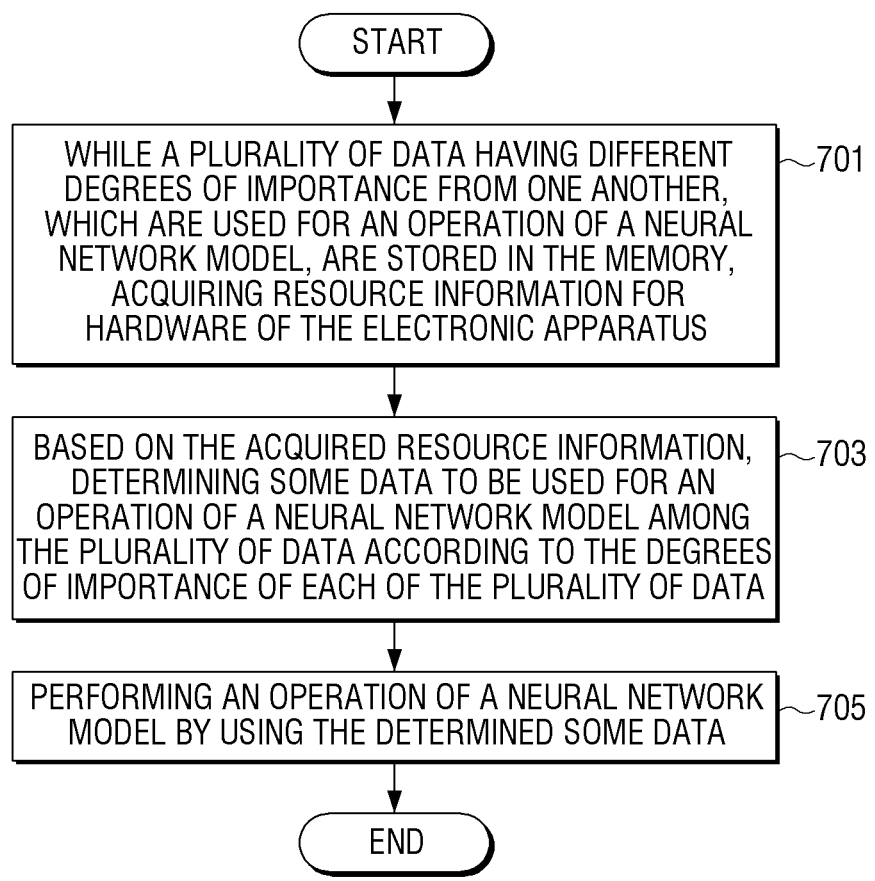
FIG. 7 is a flowchart illustrating a method for an electronic apparatus to perform an operation according to an embodiment.

FIG. 7 is a flowchart illustrating a method for the electronic apparatus 100 to perform an operation according to an embodiment.

A plurality of data having different degrees of importance from one another which are used for an operation of a neural network model may have been stored in the memory. The plurality of data having different degrees of importance from one another may include parameter values of a quantized matrix used for an operation of a neural network model. The parameter values of the quantized matrix may include binary data having different degrees of importance from one another. For example, as the bit orders of the binary data increase, the degrees of importance of the binary data may decrease. The parameter values of the quantized matrix may include parameter values of the matrix quantized by using a greedy algorithm.

In operation 701 of FIG. 7, while the plurality of data having different degrees of importance from one another are stored in the memory, the electronic apparatus 100 may acquire resource information related to hardware. The resource information related to hardware may include, for example, at least one of the power consumption of the electronic apparatus 100, the number, type, and/or specifications of the processing units performing an operation of a neural network model, or the latency of a neural network model.

In operation 703 of FIG. 7, based on the acquired resource information, the electronic apparatus 100 may obtain some data to be used for an operation of a neural network model among the plurality of data according to the degrees of importance of each of the plurality of data. For example, the electronic apparatus 100 may obtain some data to be used for an operation of a neural network model with reference to a lookup table where a plurality of scheduling modes are defined. The electronic apparatus 100 may obtain the number of binary data used for a neural network model among the plurality of data.

In operation 705 of FIG. 7, the electronic apparatus 100 may perform an operation of a neural network model by using the obtained some data. For example, the electronic apparatus 100 may perform matrix operations for an input value and each bit of binary data and sum up the operation results for each bit and acquire an output value. Alternatively, in the case a plurality of neural network processing units exist, the electronic apparatus 100 may perform a matrix parallel operation using the plurality of neural network processing units.

According to embodiments of the disclosure, a plurality of neural network models may be provided on the electronic apparatus 100. The plurality of neural network models may be, for example, implemented as at least one on-device chip and provided on the electronic apparatus 100, or may be stored in the memory 110 of the electronic apparatus 100 as software. For adaptive operation in consideration of limited hardware resources, the electronic apparatus 100 may acquire resource information related to hardware, and determine at least one neural network model to be operated among the plurality of neural network models based on the acquired resource information. For example, the electronic apparatus 100 may determine at least one neural network model according to the priorities in consideration of the accuracy of an inference or the operation speed of a neural network model.

According to embodiments of the disclosure, the electronic apparatus 100 may download at least one neural network model to be operated among the plurality of neural network models from an external apparatus. For example, for adaptive operation in consideration of limited hardware resources, the electronic apparatus 100 may acquire resource information related to hardware of the electronic apparatus 100, and transmit the acquired resource information to an external apparatus. When the external apparatus transmits at least one neural network model based on the acquired resource information to the electronic apparatus 100, the electronic apparatus 100 may store the received neural network model in the memory 110 and use it when performing an inference function. In this case, the electronic apparatus 100 may be provided with minimum neural network models for inference, and thus it is possible to reduce consumption of internal resources of the electronic apparatus 100 or consumption of network resources for communication with a server, and provide a fast result for a request for inference.

Figure 8:
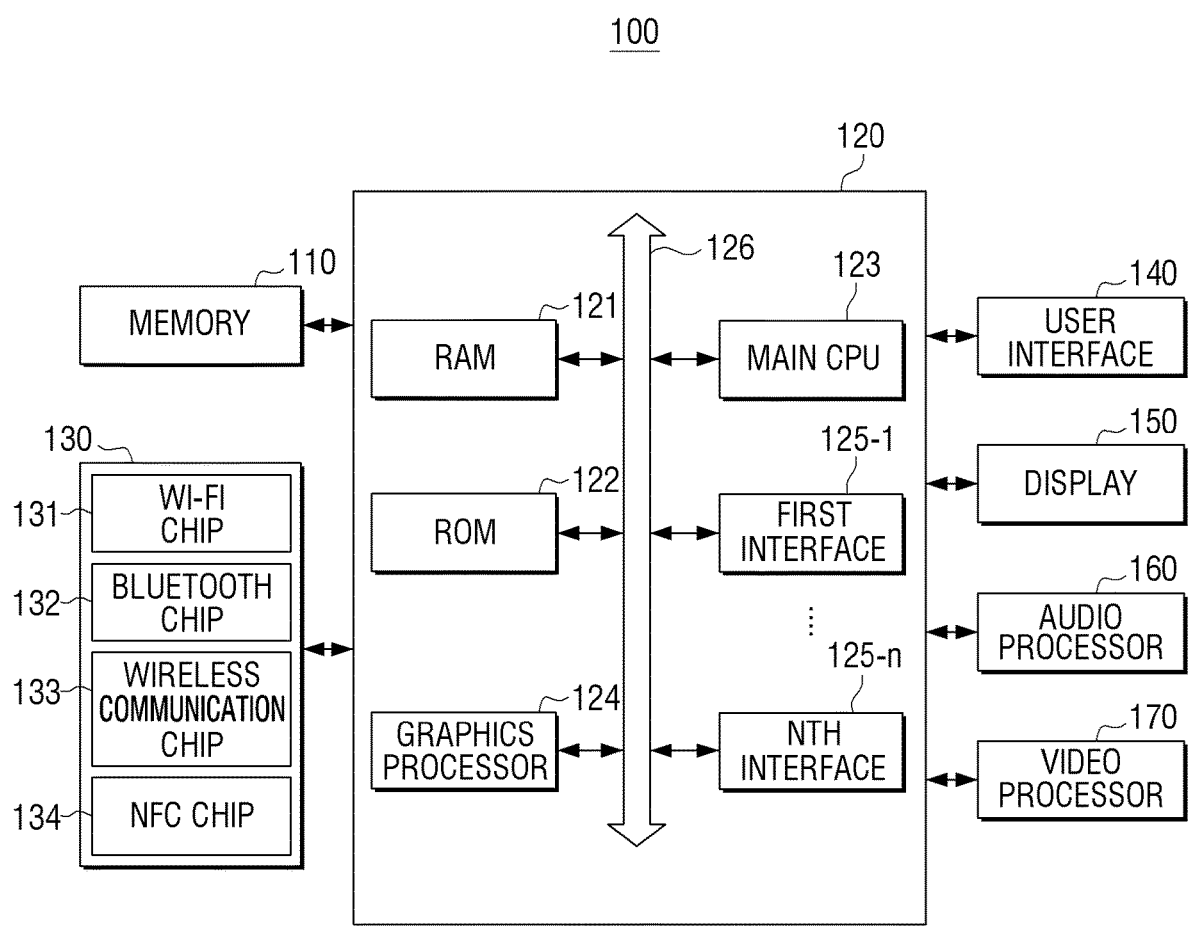
FIG. 8 is a block diagram illustrating a detailed configuration of an electronic apparatus according to an embodiment.

FIG. 8 is a block diagram illustrating a detailed configuration of the electronic apparatus 100 according to an embodiment.

According to FIG. 8, the electronic apparatus 100 includes a memory 110, a processor 120, a communicator 130, a user interface 140, a display 150, an audio processor 160, and a video processor 170. Among the components illustrated in FIG. 8, regarding the parts overlapping with the components illustrated in FIG. 1, detailed descriptions will be omitted.

The processor 120 controls the overall operations of the electronic apparatus 100 by using various kinds of programs stored in the memory 110.

Specifically, the processor 120 includes a RAM 121, a ROM 122, a main CPU 123, a graphics processor 124, first to nth interfaces 125-1 to **125-*n*, and a bus 126**.

The RAM 121, the ROM 122, the main CPU 123, the graphics processor 124, and the first to nth interfaces 125-1 to **125-*n* may be connected with one another through the bus 126**.

The first to nth interfaces 125-1 to **125-*n*** are connected with the various kinds of components described above. One of the interfaces may be a network interface connected with an external apparatus through a network.

The main CPU 123 accesses the memory 110, and performs booting by using the operating system (OS) stored in the memory 110. Then, the main CPU 123 performs various operations by using various kinds of programs, etc. stored in the memory 110.

The ROM 122 stores a set of instructions, etc. for system booting. When a turn-on instruction is input and power is supplied, the main CPU 123 copies the OS stored in the memory 110 in the RAM 121 according to the instructions stored in the ROM 122, and boots the system by executing the OS. When booting is completed, the main CPU 123 copies the various kinds of application programs stored in the memory 110 in the RAM 121, and performs various kinds of operations by executing the application programs copied in the RAM 121.

The graphics processor 124 generates a screen including various objects such as icons, images, and texts by using an operation part and a rendering part. The operation part operates attribute values such as coordinate values, shapes, sizes, and colors by which each object will be displayed according to the layout of the screen based on received control instructions. The rendering part generates screens in various layouts including objects, based on the attribute values operated at the operation part. The screens generated at the rending part are displayed in a display area of the display 150.

The above-described operations of the processor 120 may be performed by the programs stored in the memory 110.

The memory 110 is provided separately from the processor 120, and may be implemented as a hard disk, a non-volatile memory, a volatile memory, etc.

The memory 110 may store a plurality of data used for operations of neural network models. The plurality of data may include, for example, parameter values of a quantized matrix.

According to an embodiment, the memory 110 may include at least one of an OS software module for operating the electronic apparatus 100, an artificial intelligence model, a quantized artificial intelligence model, or a quantization module for quantizing an artificial intelligence model (e.g., a greedy algorithm module).

The communicator 130 is a component performing communication with various types of external apparatuses according to various types of communication methods. The communicator 130 includes a Wi-Fi chip 131, a Bluetooth chip 132, a wireless communication chip 133, a near field communication (NFC) chip 134, etc. The processor 120 performs communication with various kinds of external apparatuses by using the communicator 130.

The Wi-Fi chip 131 and the Bluetooth chip 132 perform communication by using a Wi-Fi method and a Bluetooth method, respectively. In the case of using the Wi-Fi chip 131 or the Bluetooth chip 132, various types of connection information such as a service set identifier (SSID) or a session key is transmitted and received first, and connection of communication is performed by using the information, and various types of information can be transmitted and received thereafter. The wireless communication chip 133 refers to a chip performing communication according to various communication standards such as IEEE, ZigBee, 3rd generation (3G), 3rd generation partnership project (3GPP), and long term evolution (LTE). The NFC chip 134 refers to a chip that operates in an NFC method using a 13.56 MHz band among various RF-ID frequency bands such as 135 kHz, 13.56 MHz, 433 MHz, 860~960 MHz, and 2.45 GHz.

The processor 120 may receive parameter values of at least one of an artificial intelligence module, a matrix included in an artificial intelligence model, or a quantized matrix from an external apparatus through the communicator 130, and store the received data in the memory 110. Alternatively, the processor 120 may directly train an artificial intelligence model through an artificial intelligence algorithm, and store the trained artificial intelligence model in the memory 110. The artificial intelligence model may include at least one matrix.

The user interface 140 receives various user interactions. The user interface 140 may be implemented in various forms according to implementation examples of the electronic apparatus 100. For example, the user interface 140 may be a button provided on the electronic apparatus 100, a microphone receiving user voices, a camera detecting user motions, etc. When the electronic apparatus 100 is implemented as a touch-based electronic apparatus, the user interface 140 may be implemented as a touch screen constituting an inter-layer structure with a touch pad. In this case, the user interface 140 may be used as the display 150.

The audio processor 160 is a component performing processing of audio data. At the audio processor 160, various types of processing such as decoding or amplification, noise filtering, etc. of audio data may be performed.

The video processor 170 is a component performing processing of video data. At the video processor 170, various types of image processing such as decoding, scaling, noise filtering, frame rate conversion, and resolution conversion of video data may be performed.

Through the method as described above, the processor 120 may quantize a matrix included in an artificial intelligence model.

Embodiments of the disclosure may be implemented as software (e.g., the program) including one or more instructions stored in a machine-readable (e.g., a computer-readable) storage medium (e.g., an internal memory) or an external memory, that can be read by machines (e.g., computers). In an embodiment, the machine (e.g., the processor of the electronic apparatus 100) may load one or more instructions stored in a storage medium, and can operate according to the instructions. When an instruction is executed by a processor, the processor may perform a function corresponding to the instruction itself, or may use other components under its control. An instruction may include a code generated or executed by a compiler or an interpreter. A storage medium that is readable by machines may be a non-transitory storage medium. The term 'non-transitory' means that a storage medium does not include signals, and is tangible, but does not indicate whether data is stored in the storage medium semi-permanently or temporarily.

The method according to embodiments may be provided while being stored as a computer program product. A computer program product refers to a product, and it can be traded between a seller and a buyer. A computer program product can be distributed on-line as a storage medium that is readable by machines (e.g., a compact disc ROM (CD-ROM)), or through an application store (e.g., Play Store™). In the case of on-line distribution, at least a portion of a computer program product may be stored in a storage medium such as the server of the manufacturer, the server of the application store, and the memory of the relay server at least temporarily, or may be generated temporarily.

Embodiments described above may be implemented in a recording medium that can be read by a computer or an apparatus similar to a computer, by using software, hardware, or a combination thereof. In some cases, the embodiments described above may be implemented as a processor itself. According to implementation by software, the embodiments such as processes and functions described above may be implemented as separate software modules. Each of the software modules can perform one or more functions and operations described in this specification.

Computer instructions for performing processing operations of machines according to embodiments may be stored in a non-transitory computer-readable medium. Computer instructions stored in such a non-transitory computer-readable medium make the processing operations at machines according to embodiments performed by a specific machine, when the instructions are executed by the processor of the specific machine. A non-transitory computer-readable medium refers to a medium that stores data semi-permanently, and is readable by machines, but not a medium that stores data for a short moment such as a register, a cache, and a memory. As specific examples of a non-transitory computer-readable medium, there may be a CD, a DVD, a hard disk, a blue-ray disk, a USB, a memory card, a ROM, and the like.

In addition, each of the components according to embodiments (e.g., a module or a program) may consist of a singular object or a plurality of objects. Also, among the above-described components, some components may be omitted, or other components may be further included in the embodiments. Some components (e.g., a module or a program) may be integrated as an object, and perform the functions that were performed by each of the components before integration identically or in a similar manner. Operations performed by a module, a program, or other components according to embodiments may be executed sequentially, in parallel, repetitively, or heuristically. At least some of the operations may be executed in a different order or omitted, or other operations may be added.

While embodiments of the disclosure have been particularly shown and described with reference to the drawings, the embodiments are provided for the purposes of illustration and it will be understood by one of ordinary skill in the art that various modifications and equivalent other embodiments may be made from the disclosure. Accordingly, the true technical scope of the disclosure is defined by the technical spirit of the appended claims.

What is claimed is:

1. A method for an electronic apparatus to perform an operation of an artificial intelligence model, the method comprising:
    storing a plurality of data comprising parameter values for an operation of a neural network model in a memory, wherein a degree of importance is associated with each of the parameter values;
    quantizing the parameter values into a quantized matrix of binary data;
    realigning the quantized the parameter values based on a bit order of the binary data;
    obtaining resource information corresponding to hardware of the electronic apparatus;
    selectively obtaining first data for the operation of the neural network model, among the realigned parameter values, based on the obtained resource information; and
    performing the operation of the neural network model by utilizing the obtained first data.

2. The method of claim 1, wherein the binary data respectively having degrees of importance different from each other.

3. The method of claim 2, wherein, in the binary data, the degrees of importance of the binary data decrease as bit orders of the binary data increase, respectively.

4. The method of claim 2, wherein the performing the operation of the neural network model further comprises:
    performing matrix operations for an input value and each bit of the binary data;
    summing up results of the operation for each bit; and
    acquiring an output value.

5. The method of claim 2, wherein the performing the operation of the neural network model further comprises performing a matrix parallel operation utilizing a plurality of neural network processing units based on an order of each bit of the binary data, respectively.

6. The method of claim 1, wherein the parameter values are quantized utilizing a greedy algorithm.

7. The method of claim 1, wherein the obtaining the first data further comprises obtaining the first data for the operation of the neural network model by referring to a lookup table where a plurality of scheduling modes are defined.

8. The method of claim 1, wherein the obtaining the first data further comprises obtaining a number of the binary data for the operation of the neural network model among the plurality of data that is less than a number of the plurality of data.

9. The method of claim 1, wherein the resource information for the hardware includes at least one of a power consumption of the electronic apparatus, a number of processing units performing the operation of the neural network model, or a predetermined latency of the neural network model.

10. An electronic apparatus comprising:
   a memory configured to store a plurality of data comprising parameter values for an operation of a neural network model in the memory, wherein a degree of importance is associated with each of the parameter values; and
   a processor configured to:
      quantize the parameter values into a quantized matrix of binary data;
      realign the quantized the parameter values based on a bit order of the binary data;
      obtain resource information corresponding to hardware of the electronic apparatus;
      selectively obtain first data for the operation of the neural network model, among the realigned parameter value based on the resource information corresponding to the hardware of the electronic apparatus, and
      perform the operation of the neural network model by utilizing the obtained first data.

11. The electronic apparatus of claim 10, wherein the binary data respectively having degrees of importance different from each other.

12. The electronic apparatus of claim 11, wherein, in the binary data, the degrees of importance of the binary data decrease as bit orders of the binary data increase, respectively.

13. The electronic apparatus of claim 11, wherein the processor is further configured to:
   perform matrix operations for an input value and each bit of the binary data,
   sum up results of the operation for each bit, and
   acquire an output value.

14. The electronic apparatus of claim 11, wherein the processor is further configured to:
   perform a matrix parallel operation utilizing a plurality of neural network processing units based on an order of each bit of the binary data, respectively.

15. The electronic apparatus of claim 10, wherein the parameter values are quantized utilizing a greedy algorithm.

16. The electronic apparatus of claim 10, wherein the processor is further configured to:
   obtain the first data for the operation of the neural network model by referring to a lookup table where a plurality of scheduling modes are defined.

17. The electronic apparatus of claim 10, wherein the processor is further configured to:
   obtain a number of the binary data for the operation of the neural network model among the plurality of data that is less than a number of the plurality of data.

* * * * *